June 1, 1926.

E. H. FOSTER 1,586,984

HEADER CONNECTION

Filed July 9, 1920

INVENTOR
Ernest H. Foster
BY
Kerr, Page, Cooper & Hayward
his ATTORNEYS

Patented June 1, 1926.

1,586,984

UNITED STATES PATENT OFFICE.

ERNEST H. FOSTER, OF DONGAN HILLS, NEW YORK, ASSIGNOR TO POWER SPECIALTY COMPANY, OF NEW YORK, N. Y., A CORPORATION OF NEW YORK.

HEADER CONNECTION.

Application filed July 9, 1920. Serial No. 394,984.

The invention which forms the subject of this application for Letters Patent is an improvement in means for forming joints between tubes in cases where one is united to the body of another, as illustrated, for example, in the union of boiler or superheater tubes to the headers and the like. The primary object of the invention is to secure a welded joint in which the strength of the joint and its capability of resisting separation under pressure does not depend upon the strength of the weld.

In its simplest form a welded joint of the nature now under consideration, is formed by cutting a hole in the side of one pipe, inserting the end of another pipe or tube into such hole, and then making the joint tight by building up with welding material the space between the rim of the hole and the outside surface of the inserted tube. Such joints, however, are not dependable, and are not permissible in such constructions as boilers, not only because of their liability to give way under internal pressure, but because they are forbidden by laws controlling the construction and installation of such devices.

I propose to make such joints in a manner that it will be impossible to withdraw the inserted tube without tearing the material of the pipe or tube of which it is formed. For this purpose I form or cut a hole in the larger or main pipe or tube opposite the point where the other tube is inserted, and by a tool inserted through such hole ream or expand the end of the inserted tube into close overlapping union with the under or inner edge of the rim of the hole cut to receive it, and then complete the joint by filling up with welding material the circular recess, which by the conformation of the side walls of the hole or of the tube inserted therein is formed around the said inserted tube.

In this way the properties of both a welded and an expanded joint are secured, without the disadvantages of the one or the difficulties encountered in producing a tight joint by the other. In carrying out the invention some latitude is permissible in the specific form of the joint, without departure from the principle of the invention, but this will be more fully understood from the description which follows, in which the accompanying drawing is referred to.

The tubes to be joined, as intimated above, may be of any kind and adapted for any purpose in which the benefits of my invention are to be realized. We may consider, therefore, the case of a boiler or superheater tube 1, joined to a header 2.

Figure 1:
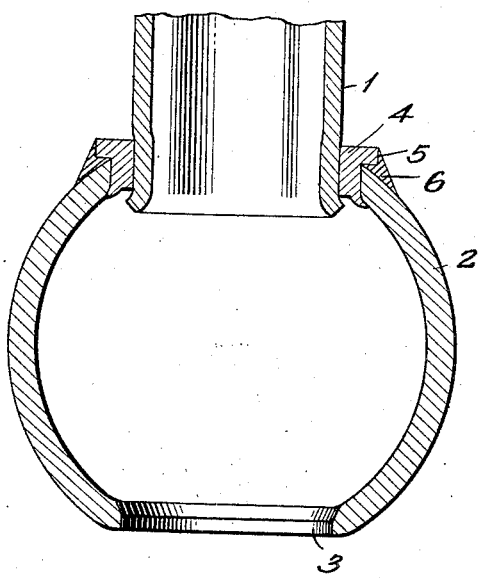
Fig. 1 is a sectional view of a joint formed between one tube and another at right angles thereto.

In one form of the invention a hand-hole 3 is formed in the header, and opposite thereto is cut a hole to receive the tube 1. Into this latter hole is fitted a collar of iron or steel 4, having a flange 5, and beveled off around the edge of that portion which enters the hole. Either before or after the insertion of the tube, the beveled edge of the collar 4 is reamed or spread by a tool inserted through the hand-hole into intimate contact with the rim of the hole, as shown in Fig. 1. When the tube 1 is inserted through this collar it is also expanded or reamed out in close union therewith, as also shown in Fig. 1, and a union thus formed between the two tubes, which is as strong as the metal of the two will permit. After this union is effected, the joint is completed by applying by the oxy-acetylene blow-pipe or by other known means a welding material 6 around and between the collar and the body of the pipe 2. A strong and tight joint is thus formed and the hand-hole may then be closed by any of the devices now used for such purposes.

Figure 2:
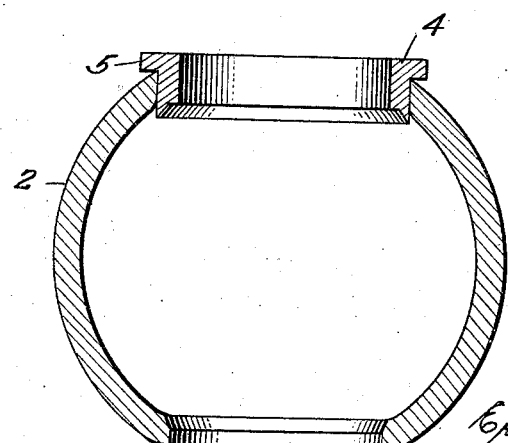
Fig. 2 is a similar section of the larger tube with a collar applied to the joint hole, but before the latter is secured thereto.

The collar is not indispensible, and whether or not it is used may depend upon whether the joint is to be made in the field, as it is termed, that is during the work of installation or prior thereto. For example, as shown in Fig. 2, the edge of the inserted pipe end may be beveled off and after its insertion through the hole cut to receive it, it is expanded or reamed out into close union with the rim of the hole, by means of a tool inserted through any kind of a hole, preferably a small hole cut in the side wall of the pipe 2, opposite the point where the tubes are joined.

Figure 3:
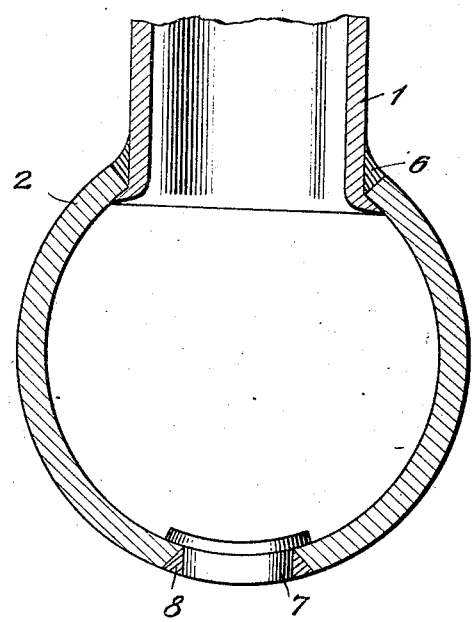
Fig. 3 is a sectional view of a modified form of joint.

This joint is completed by building up with welding material 6 around the outside surface of the tube 1 and the rim of the hole as shown in Fig. 3. In all cases either by the shape of the inserted tube, which for purposes of this case may be either a plain tube or a tube united with a collar, or by the conformation of the hole made to receive the tube, a circular recess is formed around said inserted pipe, as shown, for the reception of the welding material.

The hole opposite the joint may be closed by a flanged plug 7 inserted into the pipe through the larger hole, and secured in place by welding material 8 built up around its surface and rim of the smaller hole as shown.

The joints have all the strength of expanded joints, and all the tightness and advantages of welded joints, with none of the weakness of the latter. They may be readily made in the factory or in the field, and are not only strong but durable.

What I claim is:—

The combination with a main pipe or tube, having two oppositely disposed holes in its walls, one having outwardly bevelled edges, of a second tube, the end of which is inserted through one hole and expanded into union with the main tube, a welding material applied around the said second tube and the rim of the hole through which it is inserted and a flanged plug closing the other hole and welding material applied around it and the rim of said hole.

In testimony whereof I hereto affix my signature.

ERNEST H. FOSTER.